Feb. 17. 1925.

A. E. NORRIS

HOIST

Filed Nov. 8, 1921

Inventor:
Almon E. Norris
by Emery, Booth, Janney & Varney
Attys.

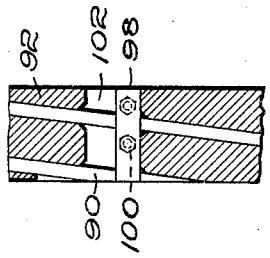
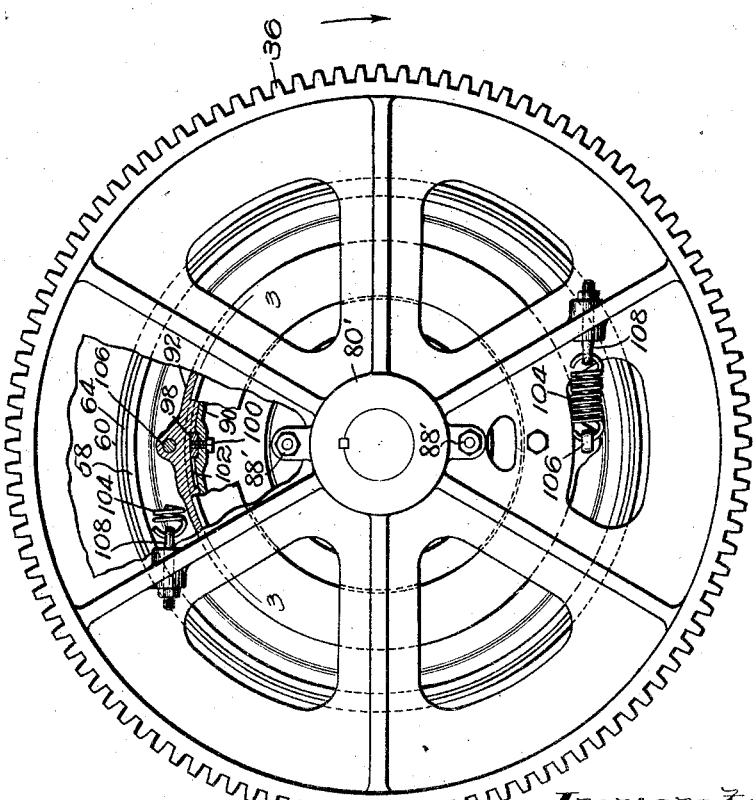

Patented Feb. 17, 1925.

1,526,864

UNITED STATES PATENT OFFICE.

ALMON E. NORRIS, OF BROOKLINE, MASSACHUSETTS.

HOIST.

Application filed November 8, 1921. Serial No. 513,665.

*To all whom it may concern:*

Be it known that I, ALMON E. NORRIS, a citizen of the United States, and a resident of Brookline, in the county of Norfolk and State of Massachusetts, have invented an Improvement in Hoists, of which the following description, in connection with the accompanying drawings, is a specification, like characters on the drawings representing like parts.

This invention aims to provide a novel and improved hoist. The invention will be best understood by reference to the following description, when taken in connection with the accompanying drawings of one specific embodiment thereof, while its scope will be more particularly pointed out in the appended claims.

In the drawings:

Fig. 2 is an end elevation of a portion of the hoist, partly in vertical section, as viewed from the left-hand side of Fig. 1; and Fig. 3 is a detail sectional view on line 3—3 of Fig. 2.

Figure 1:
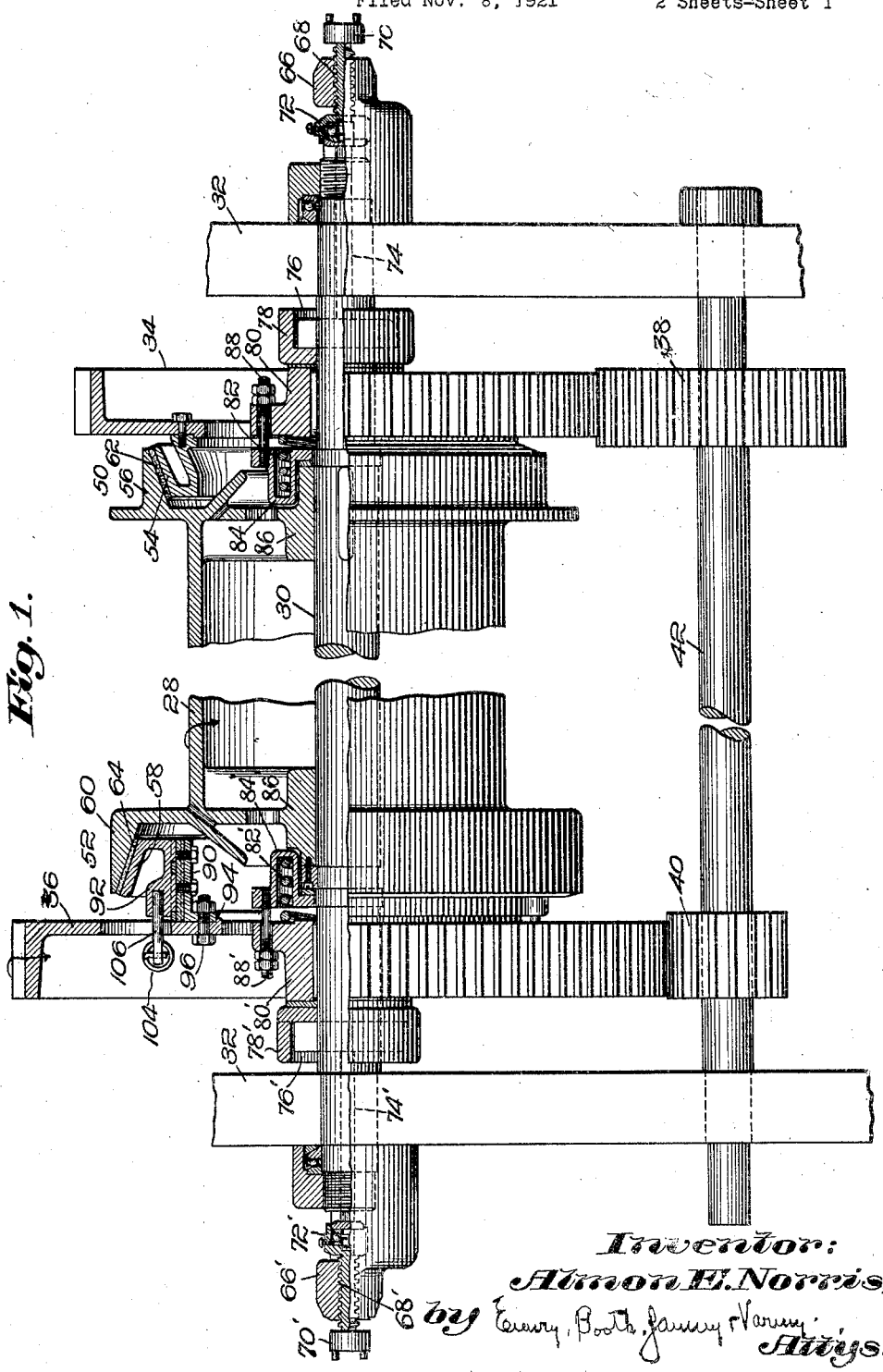
Fig. 1 is a plan of the hoist, partly in horizontal section.

Referring to the drawings, and to the embodiment of my invention which I have selected for exemplification, I have shown a drum 28 keyed on a shaft 30 received in bearings in a suitable frame 32. The drum is interposed between two drivers, herein gears 34 and 36 driven by pinions 38 and 40, respectively, secured to a shaft 42, the latter being mounted in suitable bearings in the frame. In the operation of the machine, the shaft 42 is continuously driven by a suitable motor (not shown).

The ratio of the gears 34 and 36, and their pinions 38 and 40, is such that the gears are driven at different speeds. As shown, the gear 36, being larger than the gear 34, travels at a slower speed than the latter. Power is transmitted from the gears to the drum by friction clutches designated generally by the numerals 50 and 52. The clutch 50 comprises a driving member 54 and a driven member 56, while the clutch 52 comprises a driving member 58 and a driven member 60. In the present embodiment, these clutches are of the cone type, and the driving and driven members are inner and outer cones, the inner cones being preferably faced with suitable facings 62 and 64.

The clutches are operated by moving the driving members 54 and 58 axially into and out of engagement with the driven member 56 and 60, respectively. One convenient way of doing this is to have the driving members carried axially by their respective gears 34 and 36, which are therefore mounted for axial movement on the shaft 30. The mechanism herein shown for moving the gears is similar to that in U. S. Letters Patent No. 817,268, issued to me August 10, 1906, to which reference may be had for details not disclosed herein. The mechanism for operating the gear 34 comprises a nut 66 co-operating with a screw 68 having a head 70, which is usually turned by a lever not herein shown. The inner end of the screw operates through a thrust bearing 72 against a thrust pin 74, whose inner end enagages a cross-piece or key 76 mounted to slide axially with reference to the shaft, and engaging a collar 78 which, in turn, abuts axially against the hub 80 of the gear 34. When, therefore, the screw is turned in the proper direction, it operates through the thrust pin, cross-piece and collar, to move the gear toward the left, Fig. 2, thereby causing engagement of the clutching surfaces of the driving and driven members of the high-speed clutch. Disengagement of the clutch is effected by turning movement of the screw in the opposite direction, assisted by a spring 82 interposed between the hub 80 and a collar 84, which is urged by the spring axially against the hub 86 of the drum. The collar 84 carries studs 88, which pass loosely through the hub 80 of the gear 34, and the latter therefore slides freely to and fro along the studs. The operating mechanism for the other clutch is of like construction, and it is therefore deemed unnecessary to describe the same in detail. For convenience, its parts have been designated by like numerals, with the addition of the index 1.

As it is a difficult matter for an operator to shift the drive from one clutch to the other, without causing an abrupt change of speed of the drum, I have provided means for coordinating the shifting of the drive from one driver to the other. To this end, I have interposed between the driver 36 and its clutch 52 mechanism to cause said clutch to be disengaged automatically, when the drum, driven by the driver 34, outruns the driver 36. One simple and effective means to this end is a screw 90 and a nut 92, one carried by the gear 36 and the other by the clutch member 58, coaxially therewith. The screw is shown as a hollow drum provided with a flange 94 secured to the gear 36 as by bolts 96, while the nut 92 is conveniently formed as an integral part of the clutch member 58. When, therefore, the nut is turned to and fro on the screw, engagement and disengagement of the clutch member 58 with the clutch member 60 is effected entirely independently of the clutch actuating mechanism hereinbefore described.

Referring now to Fig. 2, relative rotation of the screw and nut is limited by appropriate means, herein a key 98 secured to the screw as by cap-screws 100, and playing to and fro in a circumferential keyway 102 provided in the nut 92, the latter to this end having its threads cut away, as will be evident from an inspection of Fig. 3. When the adjacent clutch is driving the rope-winding drum, the key 98 occupies the position shown in Fig. 2, at one end of the keyway, and therefore positively drives the drum. Movement of the key toward the other end of the keyway, accompanying corresponding relative rotation of the screw and nut, takes place in opposition to suitable yielding means, herein springs 104 having their ends hooked onto pins 106 and 108 carried, respectively, by the nut 92 and gear 36.

When, in the operation of the machine, the slow-speed clutch 52 is manually engaged, while the high-speed clutch 50 is disengaged, the drum will be driven by the former at a slow speed. When, however, the operator engages the high-speed clutch 50, the drum outruns the slow-speed driver 36, thus causing the nut 92 to turn on the screw 90 in opposition to the yielding resistance afforded by the springs 104. The pitch and hand of the screw and nut are such that the limited rotation permitted by the key and keyway is sufficient to cause the nut to withdraw the clutch member 58 out of effective driving engagement with the clutch member 60, subject, of course, to the slight frictional drag of the clutching surfaces which is necessary to overcome the yielding resistance afforded by the springs. This condition will continue until the high-speed clutch is disengaged by the operator, whereupon the slow-speed clutch will be automatically re-engaged by the cooperative action of the screw and nut, the key returning to the other end of the keyway into the position represented in Fig. 2. It will be understood that the shifting of the drive is thus accomplished conveniently, and without destructive shock to the mechanism.

Having thus described one embodiment of the invention, but without limiting myself thereto, what I claim and desire by Letters Patent to secure is:

1. In a rope-winding machine, the combination of a rope-winding drum; a power shaft; two driving pinions of different diameters secured to said shaft; two driven gears of different diameter driven by said pinions, respectively; a shaft on which said gears are loosely mounted to move axially; a slow-speed friction clutch interposed between the larger gear and said drum to transmit power from such gear to said drum, said clutch comprising frictionally engaging clutch members; a high-speed friction clutch interposed between the smaller gear and said drum to transmit power from such gear to said drum; a screw and nut connecting one of said slow-speed clutch members to said larger gear; a key and keyway connection between said screw and nut limiting their relative rotation; a spring connecting said nut to said larger gear and urging said nut circumferentially in a direction to cause said nut to urge one of said high-speed clutch members into driving engagement with the other; and means to move said gear axially to cause engagement and disengagement of said clutches.

2. In a hoist, the combination of a cable-winding drum, two drivers coaxial with each other and with said drum, means for rotating said drivers in the same direction at different relative speeds, means including two coaxial clutches for transmitting power from said drivers, respectively, to said drum, and instrumentalities for enforcing a coordinated shift of the drive of said drum from one of said drivers to the other without cessation of driving effort, said instrumentalities including means providing for a limited relative rotation of such driver and its associated clutch, and means to utilize such relative rotation to engage and disengage such clutch.

3. In a hoist, the combination of a cable-winding drum, two drivers coaxial with each other and with said drum, means for rotating said drivers in the same direction at different relative speeds, frictional means for transmitting power from said drivers, respectively, to said drum, and instrumentalities for enforcing a coordinated shift of the drive of said drum from one of said drivers to the other without an intermediate lapse of the application of power to said drum, said instrumentalities including means providing for a limited relative rotation of such driver and its associated frictional means, and means to utilize such relative rotation to engage and disengage said frictional means.

4. In a hoist, the combination of a cable-winding drum, two coaxial drivers adjacent opposite ends, respectively, of said drum, means for rotating said drivers in the same direction at different relative speeds, manually controllable means at will to couple either driver to said drum to drive the latter, and means for utilizing manual coupling of the high speed driver to said drum and consequent increased speed of said drum to cause an interruption of the drive imparted by the slow speed driver to said drum.

5. In a hoist, the combination of a cable-winding drum, two coaxial drivers adjacent opposite ends, respectively, of said drum, means for rotating said drivers in the same direction at different relative speeds, manually controllable clutching means adjacent one end of said drum to couple the high speed driver to said drum to drive the latter, manually controllable clutching means adjacent the other end of said drum to couple the slow speed driver to said drum to drive the latter, and means for utilizing coupling of the high speed driver to said drum and consequent increased speed of said drum to cause an interruption of the drive imparted by the slow speed driver to said drum.

6. In a hoist, the combination of a cable winding drum, two drivers coaxial with each other and with said drum, means for causing said drivers to rotate in the same direction at different speeds, two clutches coaxial with said drivers and drum, each interposed between one of said drivers and said drum, means at will to operate said clutches to connect either driver with and to disconnect the same from said drum, and means interposed between one of said clutches and its driver automatically to cause one of said drivers to supersede the other when one of said clutches is manually operated.

7. In a rope-winding apparatus, the combination of a rope-winding drum; two drivers, either of which may be availed of for driving said drum; means to cause said drivers to travel at different relative speeds; clutches for transmitting power from said drivers to said drum; means at will to engage and disengage said clutches; a screw and nut, relative rotation of which, in one direction or the other, causes engagement and disengagement of one of said clutches; means providing for a limited, relative rotation of said screw and nut; and yielding means connecting said screw and nut and arranged to yield and to permit relative rotation of said screw and nut and consequent disengagement of the clutch which they operate, when the other clutch is engaged.

8. In a rope-winding apparatus, the combination of a rope-winding drum; two drivers, either of which may be availed of for driving said drum; means to cause said drivers to travel at different relative speeds; clutches for transmitting power from said drivers to said drum; means at will to engage and disengage said clutches; a screw carried by one of said drivers coaxially therewith; a nut cooperating with said screw and carrying one of the clutch members of clutch driven by such driver; and a spring connecting said nut to such driver and arranged to yield and to permit said nut to rotate with reference to said screw and to withdraw the clutch member carried thereby out of driving engagement with its cooperating clutch member.

9. In a rope-winding apparatus, the combination of a rope-winding drum; a slow-speed clutch having driving and driven clutching members, the latter carried by said drum; a high-speed clutch having driving and driven members, the latter carried by said drum; power-supply means connected to said driving members; and means connecting the driven member of said slow-speed clutch to said power supply means to cause said slow-speed clutch automatically to disengage when said drum is driven by said high-speed clutch at a higher rate of speed than that provided by said slow-speed clutch.

10. In a power transmission apparatus, the combination of two driving members and a driven member coaxially arranged intermediate said driving members, clutches interposed between said driving members, respectively, and said driven members, including means at will to operate said clutches, and automatic clutch engaging and disengaging instrumentalities for one of said clutches, including means to permit limited, relative rotation of such clutch and its associated driver, and means to utilize such relative rotation to engage and disengage such clutch.

11. In a power transmission apparatus, the combination of two driving members and a driven member coaxially arranged intermediate said driving members, clutches interposed between said driving members, respectively, and said driven member, including means at will to operate said clutches by axial movement toward and from said driven member, and automatic clutch engaging and disengaging instrumentalities for one of said clutches, including means to permit limited, relative rotation of such clutch and its associated driver, and means to utilize such relative rotation to engage and disengage such clutch.

12. In a machine of the class described, the combination of two driving members, a drum, two clutches interposed between said driving members, respectively, and said drum, and clutch engaging and disengaging instrumentalities interposed between one of said driving members and its associated clutch, said instrumentalities including means to permit limited, relative rotation of such member and such clutch, and means to utilize such relative rotation to engage and disengage such clutch.

13. In a machine of the class described, the combination of a drum, driving means therefor including a clutch comprising two rotatable members, one carried by said drum, a third rotatable member, and clutch engaging and disengaging instrumentalities interposed between one of said clutch members and said third member, said instrumentalities including means to limit relative rotation of such clutch member and said third member to less than one full rotation, and means to utilize such limited rotation to engage and disengage said clutch.

14. In a machine of the class described, the combination of a drum, driving means therefor including a clutch comprising two rotatable members one carried by said drum, a third rotatable member, and clutch engaging and disengaging instrumentalities interposed between one of said clutch members and said third member, said instrumentalities including means to limit relative rotation of said clutch member and said third member to less than one full rotation, means to utilize such relative rotation in one direction to engage said clutch, and a spring to utilize such relative rotation in the opposite direction to disengage said clutch.

In testimony whereof, I have signed my name to this specification.

ALMON E. NORRIS.